United States Patent [19]
Williams et al.

[11] 3,970,541
[45] July 20, 1976

[54] GAS EXTRACTION OF COAL

[75] Inventors: Derek Farnham Williams; John Charles Whitehead, both of London, England

[73] Assignee: Coal Industry (Patents) Limited, London, England

[22] Filed: Nov. 26, 1974

[21] Appl. No.: 527,249

[30] Foreign Application Priority Data
Dec. 17, 1973 United Kingdom............... 58350/73
Aug. 9, 1974 United Kingdom............... 35243/74

[52] U.S. Cl...................................... 208/8; 48/210; 210/36; 201/44
[51] Int. Cl.²...................... C10B 57/00; C10G 1/04
[58] Field of Search................ 201/36, 44; 202/170; 48/197 R, 210; 208/10, 8, 45

[56] References Cited
UNITED STATES PATENTS

| | | |
|---|---|---|
| 2,864,677 | 12/1958 | Eastman et al. ............. 48/197 R X |
| 3,018,242 | 1/1962 | Gorin ................................... 208/10 |
| 3,053,751 | 9/1962 | Garwin ................................ 208/45 |
| 3,074,877 | 1/1963 | Friedman.......................... 201/36 X |
| 3,117,921 | 1/1964 | Gorin............................... 208/10 X |
| 3,188,179 | 6/1965 | Gorin............................... 208/10 X |
| 3,211,673 | 10/1973 | Luntz et al............................ 201/36 |
| 3,232,861 | 2/1966 | Gorin et al........................ 208/10 X |
| 3,327,402 | 6/1967 | Lamb et al............................ 23/312 |
| 3,558,468 | 1/1971 | Wise ..................................... 208/45 |
| 3,562,783 | 2/1971 | Gorin............................... 208/45 X |

*Primary Examiner*—Morris O. Wolk
*Assistant Examiner*—Michael S. Marcus
*Attorney, Agent, or Firm*—Stevens, Davis, Miller & Mosher

[57] ABSTRACT

Process for the gas extraction of soluble constituents of coal which comprises heating the coal in the presence of an extractor to a terminal temperature of 400°C. to 550°C. where the extractant at the terminal temperature is in the gas phase to extract the soluble constituents from the coal and separating the extractant from the residue and recovering the extract from the extractant. The heating of the coal in the presence of an extractant is at an initial rate of 20°C. per minute and preferably as fast as possible to an initial temperature of 370°C. to 390°C. preferably 380°C. and thereafter heating the coal to a terminal temperature at a rate not more than 20°C. per minute and preferably below 5°C. per minute thereby minimizing secondary repolymerization reactions.

11 Claims, 2 Drawing Figures

GAS EXTRACTION OF COAL

The present invention relates to the gas extraction of coal. The gas extraction of coal effected by passing a gas over coal at an elevated temperature in order to remove certain products therefrom is generally well known.

Coals are materials formed by the degradation of cellulosic materials of plant origin. The degradation occurs under varying conditions of heat and pressure and coals are believed in general, to comprise cross-linked carbon structures of varying degrees of aromaticity. These cross-linked cabon structures include various elements other than carbon and hydrogen and in particular oxygen, nitrogen and sulphur. In the formation of coal, oxygen and hydrogen are lost from the cellulosic materials and the degree of cross-linking increases during formation. The properties of coal appear to vary in accordance with their age and history. The term "coal" as used in this specification is intended to include lignites which are often known as brown coals and are relatively younger in the coal structures.

In view of the nature and structure of coal it will, therefore, be appreciated that gas phase extraction of coal at an elevated temperature will result in a progressive depolymerization of the coal so that the depolymerized products are dissolved in the gas phase and removed from the ash and debris which remain, thus permitting the extract to be separated readily from the residual debris. Subsequently, the extract may be separated from the gas phase extractant.

It has been noted that the desired depolymerization of coal and release of low molecular weight constituents begins at about 300°C., and a steady increase in temperature up to about 1,000°C. increases the rate and degree of depolymerization.

Rapid heating is also in principle desirable, as it permits rapid extraction and therefore economic operation.

The problem, however, is that as the heating progresses, some repolymerisation of the products will occur by a secondary reaction which can produce a secondary product which is not extractable in the gas phase. The rate of this secondary reaction also increases with increasing temperature. It is desirable to carry out the operation such that the primary products can be extracted into the gas phase before they polymerize.

According to the present invention, therefore, there is provided a process for gas extraction of soluble constituents of coal, which process comprises heating the coal in the presence of an extractant to a terminal temperature of 400°C. to 550°C. to extract where the extractant at the terminal temperature is in the gas phase, soluble constituents from the coal, separating the extractant from the residue and thereafter recovering the extract from the extractant, wherein the heating of the coal in the presence of the extractant is at an initial rate of at least 20°C. per minute up to an intermediate temperature of 370°C. to 390°C. and thereafter heating of the coal to a terminal temperature is proceeded with at a rate of less than 20°C. per minute thereby minimizing the secondary repolymerization reactions.

The initial rate of heating may be at least 50°C. per minute and preferably 100°C. per minute. The intermediate temperature may be 380°C. and the rate of heating from the intermediate to the terminal temperature is preferably less than 10°C. per minute and more preferably less than 5°C. per minute.

The extract in the extractant phase should be removed from the extraction zone as soon as possible to minimise the repolymerization reaction.

The extractant may comprise a solvent of one or more utilisable solvent components which at the terminal temperature are above their critical temperatures. The extraction may be carried out at a pressure such that the sum of the reduced partial pressures of the solvent components is at least one and the solvent components themselves preferably have a critical temperature of greater than 150°C.

The extractant is in the gas phase at least at the terminal temperature and is preferably in the gas phase over the greater part of the range in which the slower rate of heating is practised.

The coal is preferably particulate with a size smaller than 1.5 mm. in diameter and the proportion of extractant to coal is preferably within the range of 2 to 30 times the weight of the coal.

Advantageously, the coal may be heated in contact with the extractant from the temperature of 250°C. to 380°C. in a time of less than 2 minutes. While there may be a physical difficulty in supplying sufficient heat to the coal at a rate sufficient to achieve the rate of heating greater than 100°C. per minute it is, nevertheless, desirable that the coal should be heated to the temperature of 380°C. as rapidly as possible.

The extractant may contain a solvent or utilizable solvent components which at the terminal temperature are above their critical temperatures. The utilizable solvent component may be selected from water and organic compounds having a critical temperature of above about 150°C. and preferably have a critical temperature below 550°C. The critical temperature of such utilizable solvent components is preferably above 300°C. and below 420°C. These extractants or solvent components will be clearly in the gaseous supercritical state at the terminal temperature.

It is clear that each of the utilizable solvent components should have a high stability at the terminal temperatures and they should not decompose appreciably below the terminal temperature and, furthermore it is preferred that they should not react with the coal or other materials present under the conditions of the extraction.

The reduced partial pressure of any such utilizable solvent component $i$, is its partial pressure $P_i$, at the extraction temperature relative to its critical pressure $P_{ci}$ that is to say, $P_i/P_{ci}$. As stated above, the sum of the reduced partial pressures of the utilizable solvent components which are above their critical temperatures at the terminal temperature should preferably be at least one. This is equivalent, in the case of a single substance solvent to specifying that the single substance solvent is above its critical pressure.

A single solvent could be employed as an extractant but in a process carried out on a commercial scale it might be found more convenient and economic to employ a mixture of solvents.

If the extractant contains a significant proportion of the substance whose critical temperature is above the terminal temperature a proportion at least of this substance may dissolve in the supercritical portion of the solvent. A portion of the substance whose critical temperature is above the terminal temperature may further remain in the liquid phase; this, in itself, is not detrimental to the practice of the present invention but there may be some difficulty in recovering the liquefied portion of the solvent.

The solvents that may be employed as extractant in the process of the present invention need not necessarily be completely stable up to a temperature of 550°C. or have critical temperatures within the ranges stated but it has been found that solvents which fulfil these criteria tend to be more effective.

Typical solvents are aromatic hydrocarbons having a single benzene ring and preferably not more than 4 carbon atoms in substituent groups, for example, benzene, toluene, xylene, ethylbenzene, isopropylbenzene and tri- and tetra-methylbenzenes. Alicyclic hydrocarbons may also be employed, preferably those having at least five carbon atoms and less than twelve carbon atoms. Typical cycloaliphatic compounds are cyclopentane, cyclohexane and cis- and trans- decalin and alkylated derivatives thereof. Aromatic hydrocarbons having two aromatic rings may also be employed although it should be noted that their critical temperatures are relatively high; these compounds include, for example, naphthalene, methylnaphthalene, biphenyl and biphenylmethane.

Acyclic hydrocarbons having at least five carbon atoms but not more than 16 carbon atoms may also be employed, for example, hexanes, octanes, dodecanes and hexadecanes; such aliphatic hydrocarbons, particularly if hydrogen is employed concurrently with the extraction, are preferably saturated, as the corresponding alkenes will be at least partially hydrogenated or alkylated or otherwise subjected to polymerisation under the conditions of extraction.

Where acyclic hydrocarbons are being employed, it is preferred to use relatively straight chained hydrocarbons since hydrocarbons having long branch chains are more likely to be subjected to molecular rearrangement and crossalkylation reactions under the conditions of the extraction. Such molecular rearrangements and cross-alkylation reactions can also occur in the case of alkyl substituted aromatic hydrocarbons.

Phenols, preferably those derived from aromatic hydrocarbons having up to 8 carbon atoms may be employed, for example, phenol, and xylenol; although if hydrogen is present, the phenolic hydroxyl group may be liable to be reduced under the extraction conditions. Many other oxygen-containing compounds may be employed in the extractant including alcohols, aldehydes, ketones, ethers and esters. If hydrogen is present, many of these compounds will be liable to be reduced under the extraction conditions and their use in large quantities as solvent components of the extractant is not, therefore, desirable. Furthermore, such oxygen containing compounds are liable, in the presence of catalyzing impurities in the coal, to react with coal or other compounds (producing gases) or to be subjected to molecular rearrangement and in such circumstances this may affect the amount of solvent available for re-cycling in the process. Nitrogen-containing organic compounds can also be employed in the solvent, such as amines, including aliphatic mono-, di- and tri-amines which have at least 4, and preferably at least 6 carbon atoms. It is preferred, however, not to employ aliphatic amines having more than 10 carbon atoms. The amines may be acyclic aliphatic amines, for example tri- ethylamine and di-propylamine, while aromatic amines having a benzene ring may also be employed, for example aniline, N-methylaniline, N, N-dimethylaniline, toluidine, and N-methyltoluidine. Heterocyclic amines may also be employed, for example pyridine, methylpyridines and dimethylpyridines, and alkyl derivatives of piperidine, and also halogen containing organic compounds such as chlorobenzene and sulphur compounds such as alkyl thiophenes.

In view of the comparatively high cost of the solvent components of the extractant it is preferred that the solvent components be recovered and re-cycled in a commercial process. The process itself may be conducted either as a batch process or as a continuous extraction process. In a commercial plant, a continuous process should preferably be employed. In a typical process, the coal is contacted with the solvent and is heated rapidly to the intermediate temperature. Thereafter the coal and solvent may be passed to an extraction zone in which the coal is passed counter-current to the heated extractant at the terminal temperature so that as the coal approaches the end of the heating vessel, the temperature is increased at or towards the terminal temperature of the extraction which will of course be the temperature of the extractant at introduction.

The initial heating zone may comprise a plurality of zones and the extraction zone may also comprise a plurality of zones and the initial heating zone and the subsequent heating zones may have appropriate retention times so that the relevant heating rates are achieved.

In a typical example, the heating zone may comprise an elongate tubular heater which is heated on the external surface thereof through which the coal is turbulently transported by the extractant material. It is, however, necessary to ensure that the mixture of coal and extractant does not become exposed to too high a temperature to ensure that the extracted constituents of the coal within the solvent or extractor does not become converted to coke.

In an alternative embodiment of the apparatus suitable for use in the present invention, the heating zone or zones may comprise a fluidized bed heater in which the coal comprises the bed which is fluidized by a stream of heated extractant passed upwardly therethrough.

A fluidized bed or a plurality of fluidized beds at gradually increasing temperatures may be employed in the extraction zones and if a plurality of fluidized beds are employed, a relatively small temperature difference between the fluidized beds may conveniently be employed. Thus, if the maximum desired extraction temperature is 420°C. and the intermediate temperature is 380°C., the heating zone should include a fluidized bed at 380°C. and the extraction zone may comprise two or more fluidized beds having temperatures at 5°, 10° or 20° intervals from 380°C. to 420°C. Typically, three fluidized beds having temperatures of 395°C., 410°C. and 420°C. may be employed and such an arrangement could allow for a relatively longer retention time at the 420°C. than is taken for the heating from 380°C. to 420°C.

The coal and extractant are preferably mixed at atmospheric pressure and at atmospheric temperatures. This permits easier mechanical handling than if pressures greater than atmospheric are employed. As, however, it is usual to recycle the solvent or extractant it is not normally economic to cool the solvent or extractant more than is necessary and accordingly, depending on the boiling point of the solvent temperatures of the solvent of the order of 150°C. or more may be employed.

The ratio of extractant to coal is desirably held at a low value (below about 10/1) for economic reasons. On the other hand, to a certain extent the more solvent that is present the greater the amount extracted from the coal until an extractability limit is reached. This is a normal effect in general in solvent extraction processes and particularly applies here between the intermediate and terminal temperature where it is necessary to ensure that the rate of extraction is as high as the rate of depolymerisation of the coal.

The coal itself is preferably in a finely divided form and relatively large lumps may in principle be used although these larger lumps result in a smaller surface area in which the extraction can occur, and the efficiency of extraction is reduced due to the reduced rate of extraction of constituents from the centre of larger lumps. In a continuous process, the presence of large lumps can result in mechanical handling problems in the passage of coal through the pressurizing pumps or other devices necessary in order to introduce the coal into the pressure system. Typically, the coal is sized so that it passes through a sieve having a mesh space of less than 1.5 mm. but larger coal than this may be used. In general it is suitable that coal be of a size that a sieve having a mesh space less than 3 mm. can be used and even coal having a size of up to 5 mm. have been found to be useful. Nevertheless, it is preferred that the coal should have a size of such that 90% at least has a particle size of diameter of less than 1.5 mm.

Following is a description by way of example only and with reference to the accompanying informal drawings of methods of carrying the invention into effect.

Figure 1:
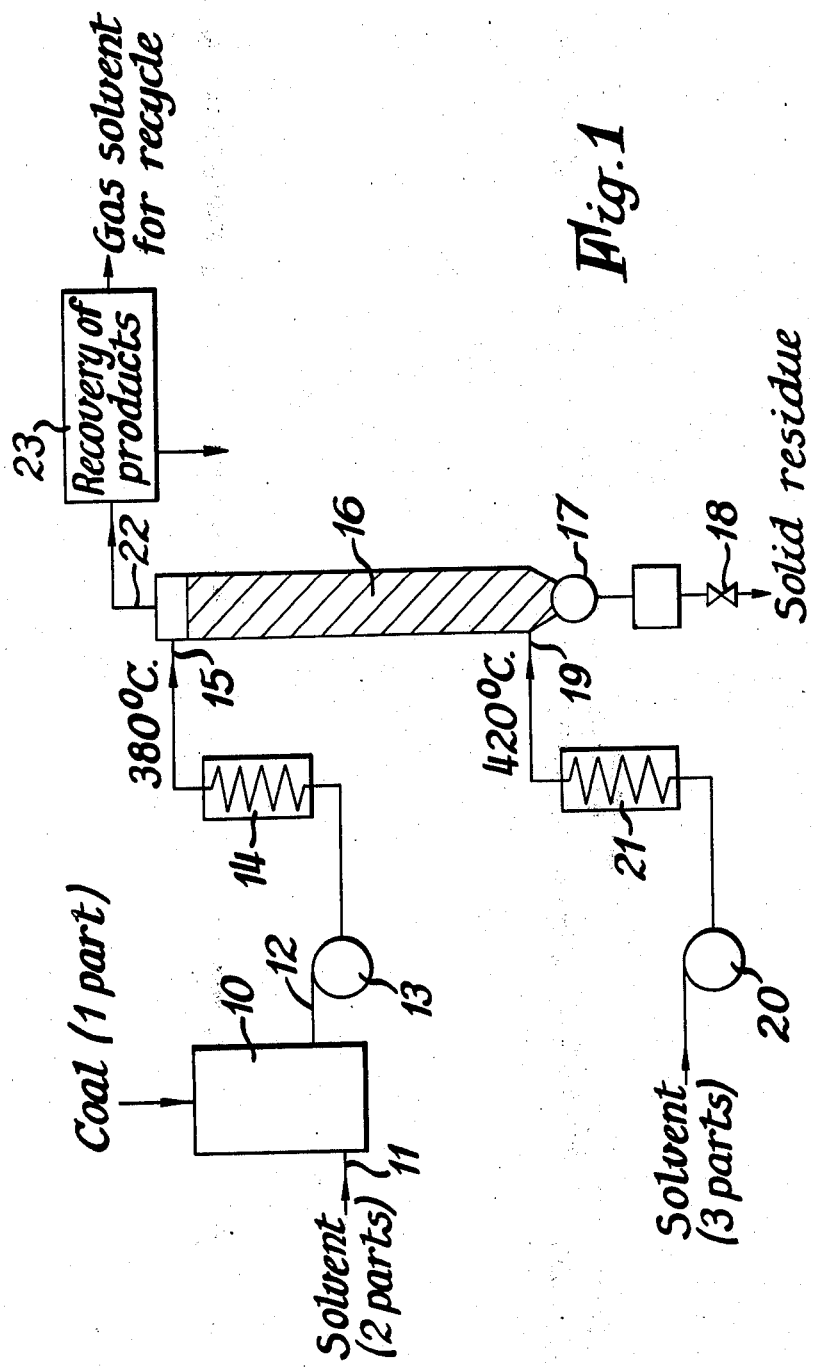
FIG. 1 is a diagrammatic representation of a flow sheet practising one embodiment of the present invention.

Referring first to the apparatus of FIG. 1, the coal is provided to a mixing vessel 10 together with a proportion of the solvent which is supplied by an inlet 11, to vessel 10. The coal and solvents are thoroughly mixed and then pumped from outlet 12 by means of pump 13 to initial heating vessel 14. Here coal solvent is rapidly heated to a temperature of 380°C. and material at that temperature passes from outlet 15 to the top of a shaft extractor 16 having towards its lower end 17 an outlet 18 for the solid residues from the extraction and having towards the lower end an inlet 19 for the supply of the remainder of the solvent at an elevated temperature.

The solvent supply is pressurized by means of pump 20 and is passed through heater 21 where the temperature of the solvent is raised to the terminal extraction temperature which may typically be 420°C. The solvent passes in the extraction shaft 16 counter-current to the flow of coal material down the shaft and the temperature of the coal is steadily and progressively increased from 380°C. at the top of the shaft to 420°C. at the bottom of the shaft. The gaseous phase extractant and the constituents carried thereby pass upwardly from the shaft extractor 16 by means of an upper outlet 22 and is then passed into a recovery plant 23 for recovery of the extracted products while the re-generated solvent is re-cycled to mixing chamber 10 and to the solvent pressurizing pump 20.

Figure 2:
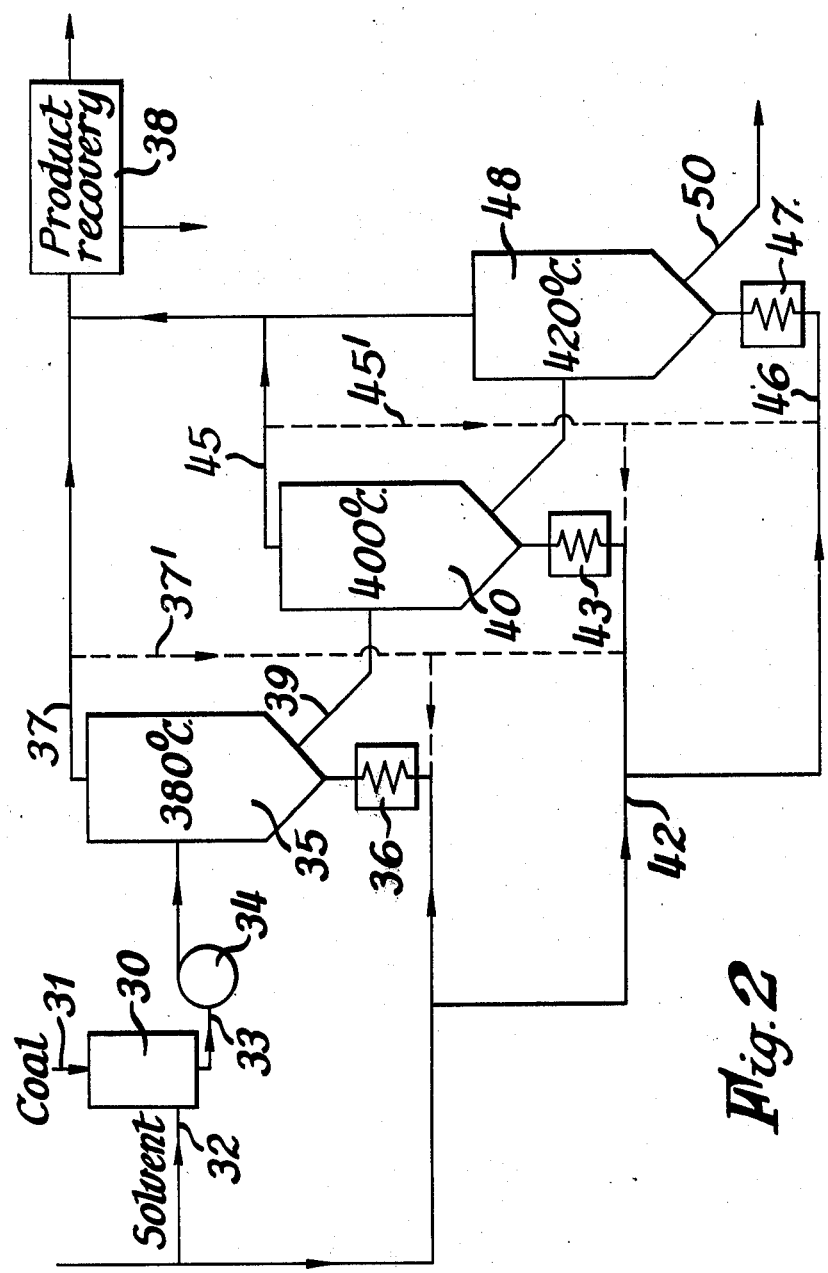
FIG. 2 is a diagrammatic representation of a flow sheet for the practice of a second embodiment.

Turning now to the arrangement shown in FIG. 2, crushed or particulate coal is introduced into a mixing chamber 30 by means of an inlet 31 and solvent is supplied to the lower end of a chamber by means of an inlet 32. After thorough mixing the material is passed from the lower end of chamber 30 by means of a feed line 33 and pressurizing pump 34 and is supplied to a fluidized bed vessel 35 in which a continuous supply of material is raised to a temperature of 380°C. Solvent is supplied to a heater 36 associated with the fluidized bed in vessel 35 in which the temperature of the solvent is raised to 380°C. or slightly in excess thereof and the heated solvent is passed upwardly through the bed and passes out of the first fluidized bed vessel 35 by means of outlet 37. A proportion of the extractant and constituents leaving vessel 35 passes to a product recovery plant 38 where extracted products are separated and the solvent is passed for recirculation. The heated coal bed in partially extracted condition is then passed from an outlet 39 to a second fluidized bed vessel 40 and a proportion 37' of solvent together with a proportion of fresh solvent via feed line 42 is fed to a heater 43 where the temperature of the solvent is raised to 400°C. The heated solvent is then passed through the fluidized bed in the manner described with reference to the vessel 35 and the solvent extractant plus extracted constituents pass out of the upper end of the vessel 40 by means of outlet 45. Again a proportion of extractant is passed to the solvent recovery plant 18 while the remainder of the solvent passes along feed line 45' to the inlet line 46 of heater 47 associated with third fluidized bed vessel 48. The partially extracted coal from the second fluidized bed vessel 40 is passed via line 49 to the third fluidized bed vessel 48 and the heated solvent passes from heater 47 at a temperature of 420°C. through the material constituting the fluidized bed to further extract the material, and the extracted solvent is passed in toto to the product recovery plant 38.

The extracted residues are then passed out of outlet 50 for disposal.

It will be appreciated that the extraction system outlined above provides a continuous or substantially continuous extraction process, and that providing hydrogenation of the solvent material is maintained at a minimum only small quantities of fresh solvent need to be employed.

The following typical examples illustrate the process of the invention:

EXAMPLE 1

A bed of coal (CRC802) having the following properties:

| Moisture | Ash | VM(daf) | C | H | O | N | S |
|----------|------|---------|-------|------|------|------|------|
| 7.6% | 3.7% | 38.1% | 82.3% | 5.1% | 9.1% | 1.8% | 1.6% | was ground to a size of not more than 10 B.S.S. mesh and confined in a tubular autoclave with a small amount of toluene, in a proportion of one part weight of solvent to one part by weight of coal. The autoclave was rapidly heated at a rate of 100°C. per minute to a temperature of 380°C. in a fluidized sand heater. At this point a flow of toluene of 30 grams per minute was introduced, the pressure was set at 1500 psig, and the temperature of the coal bed was raised at the rate of 4°C. per minute up to a terminal temperature of 420°C. and maintained at this temperature for 30 minutes while extractable material was removed in the gas phase. The gas phase was passed through a condensation train and the extracted coal constituents were recovered in 29% yield by weight of coal by distilling the toluene at 150°C. and 60 T. The composition of the extracted constituents was as follows:

C 82.8%, H 6.8%, O 7.5%, N 1.4%, S 0.9%
average molecular weight - 440

The composition of the residue from the extraction, which was recovered in 69% yield of the initial coal weight, was as follows:

V.M. (daf) 21.8%, C 83.6%, H 5.1%, O 8.2%, N 2.0%, S 1.5%

EXAMPLE 2

Example 1 was repeated, but with a heating rate of 40°C/min between 380°C. and 420°C. The flow of supercritical toluene was commenced when the temperature reached 380°C. and was continued for 40 minutes. 23% by weight of coal was extracted under these conditions. Thus the slower heating rate adopted in Example 1 was beneficial in that it allowed a greater proportion of the coal to be extracted.

EXAMPLE 3

Example 1 was repeated with o-xylene as the solvent instead of toluene. 32% of the coal was extracted.

EXAMPLE 4

Example 1 was repeated with pyridine as the solvent instead of toluene. 34% of the coal was extracted.

EXAMPLE 5

Example 1 was repeated with n-dodecane as the solvent, flowing for 20 minutes in all. 15% of the coal was extracted.

The composition of the extracts obtained in Examples 2 – 5 was similar to that given in Example 1.

EXAMPLE 6

A gaseous phase extraction was carried out using the apparatus descirbed with respect to FIG. 1 above and one part by weight of coal having the properties of Example 1 was put into the mixer 30 and mixed with two parts by weight of solvent extractant to form a slurry at atmospheric temperature and pressure. This slurry was pressurized using a reciprocating pump 13 to a pressure of the order of 3,500 p.s.i. gauge and was pumped through preheater 14 where the temperature of the slurry was rapidly raised to 380°C. at a rate of 100°C. per minute. The heated and pressurized material was then passed to the top of shaft extractor 16 through which a bed of coal moves at a rate which results in it having a total residence time so that the coal is heated at a rate of 4°C. per minute to a temperature of 420°C. Three parts of solvent per part of coal were pressurized to the same pressure preheated to 420°C. in preheater 21 and was introduced into the bottom of the shaft extractor 16, to run countercurrent up the extraction vessel. The resulting effect is that the coal passes down the shaft and is heated until it at least approaches the temperature of the inlet solvent at 420°C. For the recovery of products, a system is required which recovers and extracts heat and pressure energy from the gas solution leaving the bed and separates the extracted material from the extractant. This can be achieved in any of the well known chemical engineering techniques. In a typical system the gaseous phase may be depressurized to atmospheric pressure and cooled to precipitate the coal extract. The gas and water are then removed after completely condensing the solvent.

EXAMPLE 7

Example 2 was repeated using the apparatus of FIG. 2 which shows the use of a multiple fluidized bed assembly. Similar extraction results were obtained as described with reference to Example 2.

EXAMPLE 8

Example 1 was repeated for coals of different rank, the rate of heating from 380°C. to 420°C. being 4°C./min. The results are set out in Table 1 below:

TABLE 1

| Rank | Run | Coal | Solv: Coal Ratio | Extract Yield |
|---|---|---|---|---|
| 802 | (a) | West Cannock | 5.5 | 27.5% |
| 902 | (b) | Desford | 5.4 | 28.1% |
| 702 | (c) | Agecroft | 5.1 | 27.2% |

The initial analysis of each coal was as follows:

TABLE 2

| Coal | Moisture | Ash | V.M.(D.A.F.) | C | H | O | N | S |
|---|---|---|---|---|---|---|---|---|
| Desford | 13.8 | 6.2 | 44.2 | 80.4 | 5.2 | 11.9 | 1.50 | 1.45 |
| West Cannock | 10.6 | 4.9 | 42.2 | 82.5 | 5.3 | 9.6 | 1.65 | 1.35 |
| Agecroft | 5.3 | 2.7 | 38.4 | 84.0 | 5.2 | 7.7 | 1.90 | 1.10 |

EXAMPLE 9

Example 1 was repeated, but in this case, the toluene extractant of that example was substituted (a) by methyl isobutyl ketane and (b) by a solvent commercially available under the trade name "Solvesso". "Solvesso" is a mixture of alkyl aromatics having 95% boiling between 165°C. and 167°C. The yields are shown in following Table 3.

TABLE 3

| Solvent | Extract Yield % dry coal | Residue Yield % dry coal |
|---|---|---|
| M.I.B.K. | 21.5 | 78.5 |
| Solvesso | 31.0 | 71.0 |

We claim:
1. A process for the gas extraction of soluble constituents of coal which process comprises the steps of heating the coal in the presence of an extraction solvent at an initial rate of at least 20°C. per minute to an intermediate temperature of 370°–390°C., thereafter heating said heated solvent-coal mixture at a second rate of less than 20°C. per minute to a terminal temperature range of 400°C. to 550°C., said second rate of heating minimizing secondary polymerization reactions; said solvent at the terminal temperature range being in the gaseous phase, separating the extractant from the residue and thereafter recovering the extract from the extractant.

2. A process for the gas extraction of coal which process comprises the steps of:

mixing the coal with an extractant, heating the coal-extractant mixture to a terminal temperature of 400°C. to 550°C. at which temperature the extractant is in the gas phase to effect removal of extractable constituents from said coal, separating said extractant and extract from the residue, and recovering extract from said extractant, characterized in that heating of said coal extractant mixture is carried out at an initial rate of at least 20°C./min. up to an intermediate temperature within the range 370° to 390°C. forming a partially extracted cola product and thereafter heating said partially extracted coal product and a solvent to the terminal temperature at a rate less than 20°C./min. thereby reducing secondary repolymerization reactions.

3. A process as claimed in claim 2 characterized in that the initial rate of heating is at least 50°C. per minute.

4. A process as claimed in claim 2 characterized in that the intermediate temperature is 380°C.

5. A process as claimed in claim 2 characterized in that the rate of heating from the intermediate temperature to the terminal temperature is less than 5°C. per minute.

6. A process as claimed in claim 2 characterized in that the extractant is a solvent comprising one or more solvent components each of which at the terminal temperature is above its critical temperature.

7. A process as claimed in claim 2 characterized in that the extractant to coal weight ratio is within the range of 2 to 30.

8. A process as claimed in claim 2 characterized in that the coal is heated in contact with the extractant from a temperature of 250°C. to 380°C. in a period of less than two minutes.

9. A process as claimed in claim 2 characterized in that the extraction is a continuous process in which after the coal is contacted with the solvent the mixture is heated rapidly to the intermediate temperature and thereafter the partially extracted coal product and solvent are passed to an extraction zone in which the coal is passed counter-current to the extractant, and heated to said terminal temperature.

10. A process as claimed in claim 9 characterized in that the coal is turbulently transported while heated in the extraction zone.

11. A process as claimed in claim 9 characterized in that in each heating zone the coal is heated while extractant passes upwardly therethrough.

* * * * *